(12) United States Patent
Fukunaga

(10) Patent No.: US 10,587,166 B2
(45) Date of Patent: Mar. 10, 2020

(54) MOTOR

(71) Applicant: Nidec Corporation, Kyoto (JP)

(72) Inventor: Keisuke Fukunaga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 41 days.

(21) Appl. No.: 16/081,478

(22) PCT Filed: Feb. 28, 2017

(86) PCT No.: PCT/JP2017/007624
§ 371 (c)(1),
(2) Date: Aug. 31, 2018

(87) PCT Pub. No.: WO2017/150487
PCT Pub. Date: Sep. 8, 2017

(65) Prior Publication Data
US 2019/0097497 A1    Mar. 28, 2019

(30) Foreign Application Priority Data
Mar. 3, 2016    (JP) .................................. 2016-041212

(51) Int. Cl.
| H02K 7/116 | (2006.01) |
| H02K 29/08 | (2006.01) |
| H02K 15/16 | (2006.01) |
| H02K 5/04 | (2006.01) |
| H02K 15/02 | (2006.01) |

(52) U.S. Cl.
CPC .............. *H02K 7/116* (2013.01); *H02K 5/04* (2013.01); *H02K 15/16* (2013.01); *H02K 29/08* (2013.01); *H02K 15/022* (2013.01)

(58) Field of Classification Search
CPC ........... H02K 7/116; H02K 15/16; H02K 5/04
USPC ...................................... 310/68 B, 83; 29/596
See application file for complete search history.

(56) References Cited

U.S. PATENT DOCUMENTS

| 7,589,443 | B2* | 9/2009 | Kataoka | ............... H02K 11/215 |
| | | | | 310/68 B |
| 7,791,232 | B2* | 9/2010 | Purohit | .................. B24B 23/03 |
| | | | | 310/68 B |
| 7,795,766 | B2* | 9/2010 | Kataoka | ............... B62D 5/0403 |
| | | | | 310/68 B |

(Continued)

FOREIGN PATENT DOCUMENTS

| CN | 1388627 A | 1/2003 |
| CN | 103023201 A | 4/2013 |

(Continued)

OTHER PUBLICATIONS

Official Communication issued in International Patent Application No. PCT/JP2017/007624, dated May 16, 2017.

*Primary Examiner* — Hanh N Nguyen
(74) *Attorney, Agent, or Firm* — Keating & Bennett

(57) ABSTRACT

A motor includes a rotor including a shaft, a rotor magnet, a sensor yoke disposed axially upward from the rotor magnet, a sensor magnet supported by the sensor yoke, and an input gear including a gear portion to transmit torque to outside, an armature disposed radially outward of the rotor magnet, a bearing mechanism that supports the rotor to be rotatable, a housing that covers the armature, the rotor, and the bearing mechanism, and a rotation detection sensor facing the sensor magnet to detect rotation of the rotor.

9 Claims, 2 Drawing Sheets

(56) References Cited

U.S. PATENT DOCUMENTS

| | | |
|---|---|---|
| 2002/0175574 A1 | 11/2002 | Okazaki et al. |
| 2004/0178687 A1* | 9/2004 | Mirescu ................ H02K 3/66 310/75 R |
| 2005/0174007 A1* | 8/2005 | McClelland ............ H02K 1/06 310/216.121 |
| 2006/0125334 A1 | 6/2006 | Kataoka et al. |
| 2008/0022783 A1 | 1/2008 | Maldener et al. |
| 2014/0001900 A1* | 1/2014 | Chang ................... H02K 7/116 310/83 |
| 2015/0222152 A1 | 8/2015 | Yamada et al. |
| 2015/0295458 A1 | 10/2015 | Yamada et al. |
| 2017/0279319 A1 | 9/2017 | Yamada et al. |

FOREIGN PATENT DOCUMENTS

| | | | |
|---|---|---|---|
| CN | 105006930 A | 10/2015 | |
| JP | 8-275483 A | 10/1996 | |
| JP | 2003-009492 A | 1/2003 | |
| JP | 2012-253846 A | 12/2012 | |
| JP | 2015-142446 A | 8/2015 | |

\* cited by examiner

MOTOR

BACKGROUND OF THE INVENTION

1. Field of the Invention

The present disclosure relates to a motor.

2. Description of the Related Art

Conventionally, a device mounted in an automobile, configured to convert rotary motion of a motor to linear motion using a ball screw, and configured to input the linear motion is known. For example, a conventional device discloses an electric actuator that converts rotation of an electric motor into linear motion using a ball screw mechanism so that predetermined linear motion is performed at an input shaft.

However, in the configuration of the conventional device, since the electric motor itself vertically moves axially, it is necessary to arrange a bearing, a resolver rotor, and a resolver stator at different axial positions, and it is necessary to secure long axial lengths of the resolver rotor and the resolver stator. For this reason, there is a problem in that it is not possible to reduce the overall thickness of the motor.

SUMMARY OF THE INVENTION

Preferred embodiments of the present disclosure provide motors each having a high assembly accuracy and a reduced overall thickness.

A motor according to an exemplary preferred embodiment of the present disclosure is an electric motor including a rotor including a shaft with a vertically extending central axis as a center, a rotor magnet rotatable together with the shaft, a sensor yoke disposed axially upward from the rotor magnet and rotatable together with the shaft, a sensor magnet supported by the sensor yoke, and an input gear including a gear portion that transmits torque generated by the rotor magnet to outside, an armature disposed radially outward of the rotor magnet, a bearing mechanism that supports the rotor portion to be rotatable with respect to the armature, a housing that covers the armature, the rotor, and the bearing mechanism, and a rotation detection sensor facing the sensor magnet to detect rotation of the rotor, wherein the bearing mechanism includes a first bearing disposed axially upward from the rotor magnet and a second bearing disposed axially downward from the rotor magnet, the housing includes a housing main body including a bottom axially facing a lower end of the shaft to support the second bearing and the armature, and a bearing holder that supports the first bearing at a center thereof, the rotation detection sensor is disposed at an upper side of the bearing holder, the shaft includes an upper surface disposed axially upward and radially inward from the gear portion and an exposed portion that is exposed in regions axially downward from the gear portion and axially upward from the sensor yoke, and the exposed portion and an inner peripheral surface of the sensor magnet radially face each other.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

A motor 1 according to an preferred embodiment of the present disclosure is mounted on, for example, an electric brake booster device 8. The electric brake booster device 8 is used in a braking operation of a vehicle such as an automobile.

Figure 1:
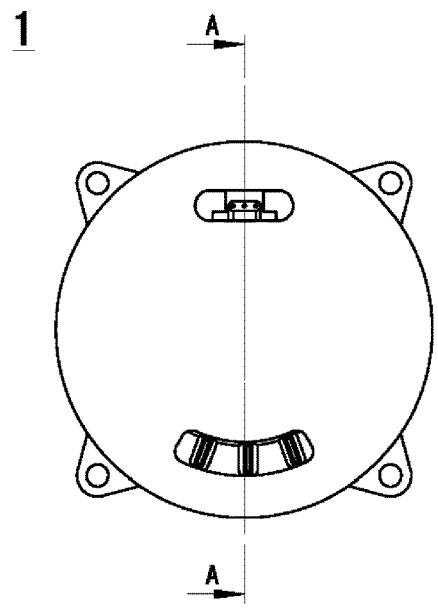
FIG. 1 is a plan view of a motor according to a first preferred embodiment of the present invention.
Figure 2:
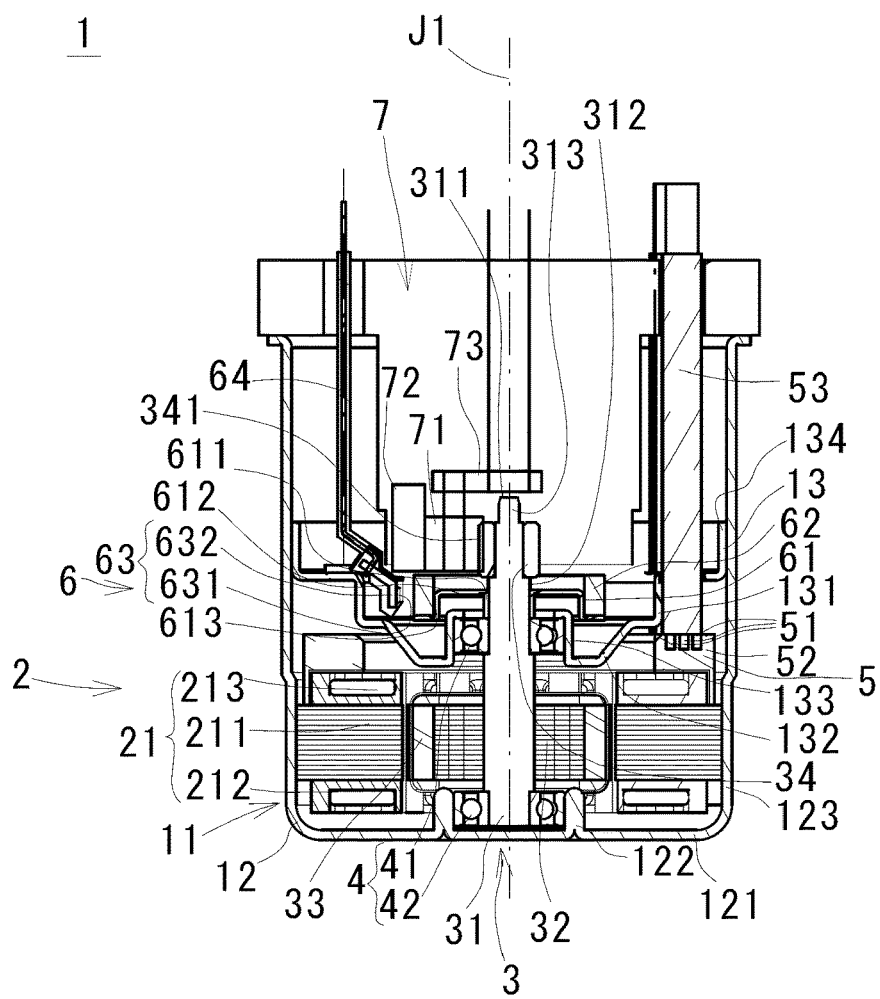
FIG. 2 is a cross-sectional view of the motor according to the first preferred embodiment of the present invention.
Figure 3:
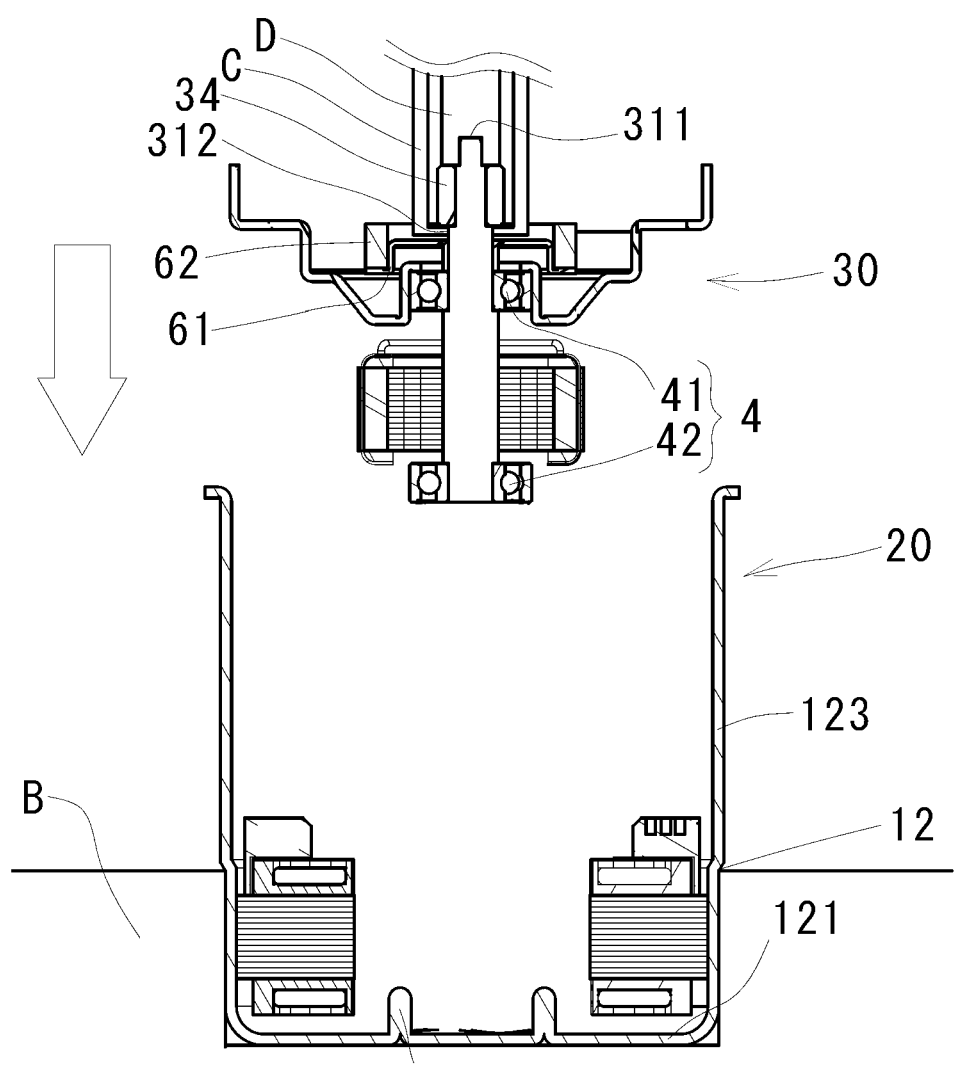
FIG. 3 relates to a method of manufacturing the motor according to the first preferred embodiment of the present invention and is a schematic diagram illustrating a step of attaching a rotor assembly to a housing.

FIG. 1 is a plan view illustrating the motor 1, and FIG. 2 is a longitudinal cross-sectional view taken along line A-A in FIG. 1. FIG. 3 illustrates a cross-section of a plane including a central axis J1 of the motor 1. The motor 1 is a three-phase AC motor driven by three-phase alternating current (AC).

As illustrated in FIG. 3, the motor 1 is an inner rotor type motor and includes a stator part 2, a rotor part 3, a bearing mechanism 4 configured to support the rotor part 3 to be rotatable about the central axis J1 with respect to the stator part 2, a bus bar unit 5 configured to connect a coil 213 of the stator part 2 to an external power supply, and a sensor 6 configured to magnetically detect an angular position around the central axis J1 of a rotor core 32 of the rotor part 3 with respect to the stator part 2.

In the following description, for convenience, the bus bar unit 5 and sensor 6 sides are described as upper sides along the central axis J1, and the stator part 2 and rotor part 3 sides are described as lower sides along the central axis J1. However, the central axis J1 does not necessarily correspond to the direction of gravity. In the motor 1, the bus bar unit 5 and the sensor 6 are disposed at an upper side of the coil 213 along the central axis J1.

The motor 1 further includes a substantially bottomed cylindrical housing 11 configured to accommodate the stator part 2, the rotor part 3, the bearing mechanism 4, and the bus bar unit 5 therein. The housing 11 has a housing main body 12 having an opening formed at an upper side along the central axis J1, and a cover part 13 disposed between an armature 21 of the stator part 2 and the sensor 6 and configured to close the opening of the housing main body 12. The housing main body 12 has a substantially-bottomed cylindrical shape, and has a bottom part 121 and a cylindrical part 123 extending axially upward from the bottom part 121. The housing main body 12 has, at the center of the bottom part 121, a second bearing holding part 122 configured to hold a second bearing 42 which will be described below. The bottom part 121 axially faces a lower end of a shaft 31. That is, there is no hole in the bottom part 121. In other words, the bottom part 121 closes one side of the cylindrical part 123.

The cover part 13 has a substantially plate-like shape. The cover part 13 has an outer cylindrical part 134 coming into contact with an inner peripheral surface of the housing main body 12 radially outward. At the outer cylindrical part 134, the cover part 13 is fixed to the housing main body 12. The cover part 13 has a concave part recessed axially downward at a radially inner side of the outer cylindrical part 134. Specifically, the cover part 13 has a first concave part 131 whose cross-section recessed downward with the central axis J1 as a center (that is, recessed toward the inside of the housing main body 12) is substantially circular at the radially inner side of the outer cylindrical part, and a second concave part 132 whose cross-section recessed further downward at a central part of the first concave part 131 is substantially circular. A detection part 63 which will be described below is accommodated inside the first concave part 131. Further, the cover part 13 includes a first bearing support part 133, which is a cylindrical portion extending axially upward from an inner end of the second concave part 132. An inner peripheral surface of the first bearing support part 133 comes into contact with an outer peripheral surface of a first bearing 41 which will be described below. The cover part 13 is a bearing holder.

The stator part 2 includes an armature 21 attached to the inner peripheral surface of the housing main body 12 by adhering or press-fitting. However, the armature 21 may also be attached to the housing main body 12 by shrink fitting, caulking, or other means. The armature 21 includes a stator core 211 formed by laminating thin silicon steel plates. The stator core 211 includes a ring-shaped core back and a plurality of teeth extending from the core back toward the central axis J1.

The armature 21 also includes an insulator 212 formed of an insulator covering surfaces of the plurality of teeth, a plurality of coils 213 formed by winding a conductor above the insulator 212 by concentrated winding around the plurality of teeth radially disposed around the central axis J1, and the bus bar unit 5 which will be described below.

In the motor 1, a coil 213 corresponding to the U-phase of a drive current, a coil 213 corresponding to the V-phase, and a coil 213 corresponding to the W-phase are respectively connected to three electrodes (that is, a U-phase electrode, a V-phase electrode, and a W-phase electrode) of the external power supply. In the present preferred embodiment, the coil 213 corresponding to the U-phase is connected in parallel to the U-phase electrode of the external power supply (the same applies for the V-phase and W-phase).

The rotor part 3 includes the shaft 31 having the central axis J1 as the center, the rotor core 32 attached around the shaft 31, a rotor magnet 33, and an input gear 34. The rotor core 32 has a substantially cylindrical shape and is formed by laminating thin magnetic steel plates. The rotor magnet 33 has a substantially cylindrical shape and is fixed to an outer peripheral surface of the rotor core 32 by an adhesive. However, the rotor magnet 33 may not have the substantially cylindrical shape, and instead, for example, a plurality of plate-like magnets may be disposed in a circumferential direction. In that case, an outer peripheral shape of the rotor core may be polygonal instead of circular. The fixing of the rotor core 32 and the rotor magnet 33 may be performed by means other than adhering, such as integrating a magnet holder formed of resin with the rotor core and then press-fitting a magnet into the magnet holder. In the motor 1, the rotor magnet 33 is disposed at the central axis J1 side of the armature 21 formed in a ring shape having the central axis J1 as the center. That is, the armature 21 is disposed radially outward of the rotor magnet 33. Also, a rotary force (torque) around the central axis J1 is generated between the armature 21 and the rotor magnet 33. That is, the motor 1 is an inner rotor type motor.

The input gear 34 is attached around the shaft 31 and has a gear part 341 at an outer peripheral surface. The input gear 34 is disposed axially upward from the first bearing support part 133 of the cover part 13. The shaft 31 has a protruding part 313 protruding axially upward from the input gear 34. The shaft 31 has an upper surface 311 disposed radially inward from the gear part 341 at an upper end of the protruding part 313. Here, the shaft 31 has a stepped part at a lower side of the input gear 34, and a diameter of an upper side of the stepped part is less than that of a lower side of the stepped part. Further, the shaft 31 has a stepped part at an upper side of the input gear 34, and a diameter of an upper side of the stepped part is less than that of a lower side of the stepped part. By having such stepped parts, axial positioning of the input gear 34 and attachment of the input gear are facilitated.

A plurality of planetary gears 71 are disposed radially outward of the input gear 34 of the shaft 31. Each planetary gear 71 is supported to be rotatable around a radial center of itself by a carrier 73 and is supported to be revolvable around the central axis J1. An internal gear 72 which has a ring shape and is engaged with the teeth of each planetary gear 71 is disposed radially outward of each planetary gear 71. The gear part 341 of the input gear 34 is engaged with the teeth of the planetary gears 71. As a result, a planetary reduction unit 7 is configured by the input gear 34, the planetary gears 71, and the internal gear 72.

A ball screw (not illustrated) is connected to the planetary reduction unit 7. The ball screw is directly or indirectly connected to the carrier 73. The torque output from the motor 1 is transmitted from the shaft 31 of the rotor part 3 to the ball screw via the input gear 34 and the planetary reduction unit 7. That is, the gear part 341 of the input gear 34 transmits the torque generated by the rotor magnet 33 to the outside. The ball screw is a mechanism for changing rotary motion to axial vertical motion. For example, an electric brake is connected to the ball screw.

The bearing mechanism 4 includes the first bearing 41 accommodated and held in the first bearing support part 133 of the cover part 13 of the housing 11 and includes the second bearing 42 attached to the concave part formed in the center of the bottom part of the housing main body 12. The rotor part 3 is supported to be rotatable with respect to the stator part 2 by the bearing mechanism 4. The first bearing 41 is disposed axially upward from the rotor magnet 33. The second bearing 42 is disposed axially downward from the rotor magnet 33. In the present preferred embodiment, ball bearings are used as the first bearing 41 and the second bearing 42. The shaft 31 of the rotor part 3 protrudes upward from the cover part 31 along the central axis J1 via an opening in a central part of the first bearing support part 133, and is supported to be rotatable by the first bearing 41 and the second bearing 42 at the upper side and the lower side along the central axis J1. In the shaft 31, a place where the rotor core 32 is fitted has the largest diameter, and the shaft 31 has a stepped part whose diameter decreases in a place where the first bearing 41 is disposed at an upper side of the place where the rotor core 32 is fitted. Also, the shaft 31 has a stepped part whose diameter decreases in a place where the second bearing 42 is disposed at a lower side of the rotor core 32. By such stepped parts being formed, it becomes possible to apply a preload to the first bearing and the second bearing. Also, by such stepped parts, the first bearing and the second bearing can be easily positioned with respect to the shaft.

Here, when the lower side of an edge of the opening of the housing main body 12 is regarded as the inside of the housing 11, the stator part 2, the rotor part 3, the bearing mechanism 4, the bus bar unit 5, and the sensor 6 are accommodated inside the housing 11. Also, when the lower side of the cover part 13 is regarded as the inside of the housing 11, the stator part 2, the rotor part 3, the bearing mechanism 4, and the bus bar unit 5 are accommodated inside the housing 11.

The bus bar unit 5 includes a plurality of bus bars 51 formed by a conductor and includes an insulating bus bar holder 52 configured to hold the plurality of bus bars 51 without causing the plurality of bus bars 51 to come into contact with each other around the central axis J1. The number of bus bars 51 is three in the present preferred embodiment, but may be appropriately changed.

The bus bar holder 52 may be substantially ring shaped with the central axis J1 as the center and includes three concentric groove parts which are substantially ring shaped with the central axis J1 as the center and have an opening at an upper side (that is, the side opposite to the armature 21). Each of the plurality of bus bars 51 is substantially arc shaped and belt shaped with the central axis J1 as the center and has one main surface disposed toward the central axis J1 within the groove part of the bus bar holder 52.

As described above, in the motor 1, the three coils 213 corresponding to each phase of the drive current are connected in parallel. Also, each coil 213 is electrically connected to each bus bar 51 to correspond to each phase. Each bus bar 51 has a cable 53 connected to the external power supply. Electricity is supplied from the cable 53 to each coil 213 via each bus bar 51.

The sensor 6 has a sensor yoke 61, a sensor magnet 62, and the detection part 63. The sensor yoke 61 has a substantially ring shaped part fixed to the shaft 31 and formed by a magnetic body and has a plate-like shape perpendicular to the central axis J1. The sensor yoke 61 rotates together with the shaft 31. The sensor yoke 61 has a cylindrical fastening part 611 fixed to the shaft 31, a plate-like part 612 extending radially outward from the fastening part 611, and a sensor magnet support part 613 which is disposed at a radial outer end of the plate-like part 612 and extends toward the axial lower side past the fastening part 611. The sensor magnet 62 has a ring shape with the central axis J1 as the center that is supported by the sensor yoke 61 (that is, fixed to the shaft 31 via the sensor yoke 61 around the shaft 31). The sensor yoke 61 and the sensor magnet 62 are fixed by an adhesive. However, the sensor magnet 62 may also be integrally formed with the sensor yoke 61. The sensor yoke 61 is disposed axially upward from the first bearing support part 133 of the cover part 13. Also, the sensor yoke 61 is disposed axially downward from the input gear 34. The sensor yoke 61 and the sensor magnet 62 are accommodated in the first concave part 131 of the cover part 13. Also, the sensor 6 has the detection part 63 configured to detect a change in a magnetic flux caused by rotation of the sensor magnet 62. The detection part 63 (rotation detection sensor) is disposed on the cover part 13 and fixed. The detection part 63 is a magnetoresistive (MR) sensor 631 and is mounted on a sensor substrate 632. However, other detection means such as a Hall element and a resolver stator may also be used as the detection part 63. A cable 64 is connected to the sensor substrate 632, and a signal detected by the detection part 63 is transmitted to a control device installed outside the motor 1.

The fastening part 611 of the sensor yoke 61 is disposed at the center of the plate-like part 612 of the sensor yoke 61, and is a cylindrical part coming into contact with the outer peripheral surface of the shaft 31 at an inner peripheral surface thereof. The cylindrical part (fastening part 611) extends axially downward from the inside of the plate-like part 612. By this configuration, the sensor magnet support part 613 of the sensor yoke 61 and the first bearing support part 133 radially face each other. Therefore, the overall thickness of the motor 1 can be reduced.

In addition, a lower end of the cylindrical part (fastening part 611) is in contact with an upper end of an inner ring of the first bearing 41. As a result, it is possible to suppress axially upward movement of the inner ring of the first bearing 41. Therefore, since a retainer such as an E-ring does not have to be separately disposed on the shaft 31, the number of parts can be reduced. However, the lower end of the cylindrical part may not be in contact with the upper end of the inner ring of the first bearing 41.

The cover part 13 has a sensor accommodation part, and the detection part 63 is accommodated in the sensor accommodation part. In the present preferred embodiment, the sensor accommodation part is the first concave part 131. Therefore, the thickness of the motor 1 can be reduced in comparison to the case in which the cover part 13 is simply a flat plate-like member. Further, the second concave part 132 of the cover part 13 and the bus bar unit 5 radially face each other. Therefore, the armature 21 and at least a part of the cover part 13 radially face each other. Therefore, the overall thickness of the motor 1 can be reduced.

The shaft 31 has the upper surface 311 disposed radially inward from the gear part 341 and axially upward from the gear part 341. Also, the shaft 31 has an exposed part 312 that is exposed in regions axially downward from the gear part 341 and axially upward from the sensor yoke 61. By this configuration, manufacturing of the motor 1, which will be described below, is facilitated.

The inner peripheral surface of the sensor magnet 62 and the exposed part 312 radially face each other. By this configuration, the overall thickness of the motor 1 can be reduced.

Further, the inner peripheral surface of the sensor magnet support part 613 of the sensor yoke 61 and the first bearing support part 133 of the cover part 13 radially face each other. As a result, the overall thickness of the motor 1 can be reduced.

Next, a method of manufacturing the motor 1 will be described. Since the configuration of the motor 1 is the same as the above-described configuration, description thereof will be omitted. Hereinafter, only the manufacturing procedure will be described.

First, the armature 21 is fixed to the housing main body 12 to prepare a stator part assembly 20.

Next, the bearing mechanism 4, the sensor yoke 61, the sensor magnet 62, and the cover part 13 are installed in the rotor part 3 to prepare a rotor part assembly 30. At this time, the exposed part 312 through which the shaft 31 is exposed is formed between the gear part 341 and the sensor yoke 61 of the rotor part 3.

Finally, the rotor part assembly 30 is attached to the stator part assembly 20. Referring to FIG. 3, first, the stator part assembly 20 is fixed to a workbench B. Then, the exposed part 312 of the rotor part assembly 30 is gripped using a jig C. Then, the upper surface 311 is pressed axially downward using a jig D, and the rotor part assembly 30 is inserted into the cylindrical part 123 of the housing main body 12 of the stator part assembly 20. At this time, since the upper surface 311 can be pressed while the exposed part 312 is gripped, the rotor part assembly 30 can be inserted while a slope of the rotor part assembly 30 with respect to the stator part assembly 20 is adjusted. Therefore, the rotor part assembly 30 can be accurately fixed to the stator part assembly 20. Also, the rotor part assembly 30 can be pressed even after the input gear 34 (gear part 341), the sensor yoke 61, and the sensor magnet 62 are attached. Therefore, a load applied to the bearing mechanism 4 can be reduced in comparison to the case in which the input gear, the sensor yoke, and the sensor magnet are attached after the rotor part assembly 30 is fixed to the stator part assembly 20. As a result, the motor 1 can be provided with high rotation accuracy and long service life. Also, the rotor part assembly 30 can be fixed to the stator part assembly 20 even when an opening is not formed in the bottom part 121. That is, one side of the cylindrical part 123 can be closed by the bottom part 121. Therefore, it is unnecessary to additionally install a waterproof structure and a waterproof part in the housing 12. As a result, the structure of the motor 1 can be simplified.

Exemplary preferred embodiments of the present disclosure have been described above, but various modifications can be made within the scope not departing from the gist of the present disclosure.

For example, the detection part 63 is accommodated in the first concave part 131 in the above-described preferred embodiment, but the shape of the first concave part 131 is not limited to that of a concave part recessed in a ring shape. Only a part of the first concave part 131 in a circumferential direction may be recessed.

The cover part 13 may be configured of a plurality of members. A member supported by the housing main body and a member configured to support the bearing mechanism may be separate members. Further, the fastening part 611 of the sensor yoke 61 has been described as extending radially downward from the plate-like part 612, but the fastening part 611 may extend radially upward.

The shape of a detailed part of the motor 1 may differ from the shape illustrated in each drawing of the present application. In addition, each element mentioned in the above-described preferred embodiments and modifications may be appropriately combined within a range in which inconsistency does not occur.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor including a shaft with a vertically extending central axis as a center, a rotor magnet that rotates together with the shaft, a sensor yoke disposed axially upward from the rotor magnet to rotate together with the shaft, a sensor magnet supported by the sensor yoke, and an input gear including a gear portion that transmits torque generated by the rotor magnet to outside;
    an armature disposed radially outward of the rotor magnet;
    a bearing mechanism that supports the rotor to be rotatable with respect to the armature;
    a housing that covers the armature, the rotor, and the bearing mechanism; and
    a rotation detection sensor facing the sensor magnet to detect rotation of the rotor; wherein
    the bearing mechanism includes a first bearing disposed axially upward from the rotor magnet and a second bearing disposed axially downward from the rotor magnet;
    the housing includes a housing main body including a bottom axially facing a lower end of the shaft to support the second bearing and the armature, and a bearing holder that supports the first bearing at a center thereof;
    the rotation detection sensor is disposed at an upper side of the bearing holder;
    the shaft includes an upper surface disposed axially upward and radially inward from the gear portion and an exposed portion that is exposed in regions axially downward from the gear portion and axially upward from the sensor yoke; and
    the exposed portion and an inner peripheral surface of the sensor magnet radially face each other.

2. The motor according to claim 1, wherein the shaft has a protrusion protruding axially upward from the gear portion.

3. The motor according to claim 1, wherein
    the sensor yoke includes a fastener directly or indirectly fastened to the shaft, and a sensor magnet support disposed radially outward of the fastener and extends axially downward from the fastener; and
    an inner peripheral surface of the sensor magnet support and an outer peripheral surface of the bearing support radially face each other.

4. The motor according to claim 1, wherein the bearing holder includes:
    an outer cylindrical portion supported by contact with a cylindrical portion of the housing main body;
    a concave portion recessed axially downward at a radially inner side of the outer cylindrical portion; and
    a bearing support, which is a cylindrical portion extending axially upward at a radially inner side of the concave portion; wherein
    an inner peripheral surface of the bearing support contacts with an outer peripheral surface of the first bearing.

5. The motor according to claim 1, wherein
    the bearing holder includes a sensor accommodation portion recessed axially downward; and
    the rotation detection sensor is disposed in the sensor accommodation portion.

6. The motor according to claim 1, wherein
    the bearing holder includes a sensor accommodation portion recessed axially downward;
    the armature includes a stator core including a plurality of teeth, coils wound around the teeth, and a bus bar unit that connects the coils to each other; and
    an upper end of the armature radially faces at least a portion of the bearing holder.

7. The motor according to claim 1, wherein
    the sensor yoke includes a plate-shaped portion extending in a direction orthogonal to the central axis, and a cylindrical portion disposed at a center of the plate-shaped portion and contacts with the outer peripheral surface of the shaft at an inner peripheral surface thereof; and
    the cylindrical portion extends axially downward from an inside of the plate-shaped portion.

8. The motor according to claim 7, wherein
    the first bearing is a rolling bearing including an inner ring, an outer ring, and a roller; and
    a lower end of the cylindrical portion contacts with an upper end of the inner ring of the first bearing.

9. A method of manufacturing a motor including a rotor including a shaft with a central axis as a center, an upper surface disposed axially upward and radially inward from a gear portion, and an exposed portion that is exposed in regions axially downward from the gear portion and axially upward from a sensor yoke, a rotor magnet rotatable together with the shaft, the sensor yoke disposed axially upward from the rotor magnet, a sensor magnet supported by the sensor yoke, and an input gear including the gear portion to transmit torque generated by the rotor magnet to an outside; an armature disposed radially outward of the rotor magnet; a bearing mechanism that supports the rotor to be rotatable with respect to a stator and includes a first bearing disposed axially upward from the rotor magnet and a second bearing disposed axially downward from the rotor magnet; a housing that covers the stator, the rotor, and the bearing mechanism and includes a housing main body including a bottom and a bearing holder to support the first bearing at a radially inner side thereof; and a rotation detection sensor at an upper side of the bearing holder to face the sensor magnet to detect rotation of the rotor, the method comprising:
- (a) attaching the armature to the housing main body;
- (b) preparing a rotor assembly including the rotor, the bearing mechanism, and the bearing holder; and
- (c) attaching the rotor assembly to the housing by gripping the rotor assembly at the exposed portion and pressing the upper surface of the shaft axially downward.

* * * * *